US008332241B2

(12) United States Patent  
Harrell et al.

(10) Patent No.: US 8,332,241 B2
(45) Date of Patent: Dec. 11, 2012

(54) METHOD FOR SELLING MARINE CARGO INSURANCE IN A NETWORK ENVIRONMENT

(75) Inventors: Donald Harrell, Old Greenwich, CT (US); Bill Lang, Babylon, NY (US); Dennis Sivley, Pearl River, NY (US); Frank Reilly, Florham Park, NJ (US)

(73) Assignee: American International Group, Inc., New York, NY (US)

( * ) Notice: Subject to any disclaimer, the term of this patent is extended or adjusted under 35 U.S.C. 154(b) by 511 days.

(21) Appl. No.: 11/874,003

(22) Filed: Oct. 17, 2007

(65) Prior Publication Data

US 2009/0240530 A1 Sep. 24, 2009

Related U.S. Application Data

(63) Continuation of application No. 09/942,078, filed on Aug. 28, 2001, now abandoned.

(60) Provisional application No. 60/228,882, filed on Aug. 29, 2000.

(51) Int. Cl.
G06Q 40/00 (2012.01)
(52) U.S. Cl. ............................................................ 705/4
(58) Field of Classification Search ................... 705/4
See application file for complete search history.

(56) References Cited

U.S. PATENT DOCUMENTS

| 4,831,526 A | 5/1989 | Luchs et al. ................ 364/401 |
| 5,757,917 A | 5/1998 | Rose et al. ...................... 380/25 |
| 5,870,711 A | 2/1999 | Huffman ........................... 705/8 |
| 5,899,980 A | 5/1999 | Wilf et al. ...................... 705/26 |
| 6,035,283 A | 3/2000 | Rofrano ......................... 705/27 |
| 6,315,196 B1 | 11/2001 | Bachman ..................... 235/380 |
| 6,405,177 B1 | 6/2002 | DiMattina ..................... 705/26 |
| 6,411,939 B1* | 6/2002 | Parsons ........................ 705/35 |
| 6,862,571 B2 | 3/2005 | Martin et al. .................... 705/4 |
| 6,922,720 B2 | 7/2005 | Cianciarulo et al. ......... 709/217 |
| 2002/0082880 A1 | 6/2002 | Salloum ........................ 705/6 |
| 2002/0091574 A1 | 7/2002 | Lefebvre et al. ............. 705/19 |
| 2002/0116228 A1 | 8/2002 | Bauer et al. ..................... 705/4 |
| 2002/0120527 A1* | 8/2002 | Lam et al. ..................... 705/26 |

FOREIGN PATENT DOCUMENTS

WO   WO 01/39090 A1   5/2001

OTHER PUBLICATIONS

What's new? (Dec. 1998). Insurance Brokers' Monthly and Insurance Adviser, 48(12), 27. Retrieved Jul. 25, 2012.*
Paul M Hummer. (1999). Common reinsurance issues: Follow the fortunes, late notice and rescission. Defense Counsel Journal, 66(3), 374-383. Retrieved Jul. 25, 2012.*
Jeffery A. Siderius, "Insurance for Electronic Data Risks: An Idea whose time has come?" Mealey's Technology Litigation and Insurance, Mar. 1999, vol. 1, #1, (4 pages).

(Continued)

Primary Examiner — Kito R Robinson
(74) Attorney, Agent, or Firm — Leydig, Voit & Mayer, Ltd.

(57) ABSTRACT

A storage media and method for transacting cargo insurance business in a network environment includes the on-line automation of quoting, billing, certificate issuance, underwriting, and claims processing. Moreover, the method also includes customer qualification and support services, in addition to data collection and analysis, for management report generation.

25 Claims, 17 Drawing Sheets

OTHER PUBLICATIONS

Daniel S. Levine, Cargo Insurance, World Trade, Aug. 1997, vol. 10, Issue 8, (3 pages).
"Net Exporter," Cambell, A.J., Business America, Sep. 1998, vol. 199, Issue 9, (3 pages).
"Covering Ocean Cargo," Fletcher, Doyle W., American Agent & Broker, Oct. 1997, vol. 69, Issue 10, (5 pages).
"Delivering the Goods for Truckers," Brown, Marshall, American Agent & Broker, Oct. 1996, Vo. 68, Issue 10, (5 pages).

* cited by examiner

FIG. 2 CREATE QUOTE SYSTEM WORKFLOW

METHOD FOR SELLING MARINE CARGO INSURANCE IN A NETWORK ENVIRONMENT

CROSS-REFERENCE TO RELATED APPLICATION

The present application is a continuation of U.S. patent application Ser. No. 09/942,078, filed Aug. 28, 2001, entitled "Method for Selling Marine Cargo Insurance in a Network Environment" and which claims the benefit of U.S. Patent Application No. 60/228,882, filed Aug. 29, 2000, entitled "Method for Selling Marine Cargo Insurance in a Network Environment" the entire disclosures of which are incorporated herein by reference.

BACKGROUND OF THE INVENTION

The present invention relates to a method for transacting cargo insurance business on-line. More specifically, the present invention relates to a method for automatically quoting, issuing, and supporting a cargo insurance policy on the internet, as well as the processing of insurance claims from first notice of loss to settlement of claim.

For purposes of this application, "on-line" refers to any transaction occurring on a network such as a LAN, WAN, Intranet, VPN (Virtual Private Network), etc. As an example, the network may be the Internet.

The cargo insurance business encompasses a wide variety of information exchanges with prospective and active customers, as well as extensive support functions for the insuring process. In a preferred embodiment the customer uses a computer, PDA (personal digital assistant), or other networking device to access the inventive system. As an example, this networking device may use existing web-browser software to access a known URL corresponding to a website providing the inventive system.

For example, typical customer interfaces include:
Requesting quotes for open policies and individual shipment insurance;
Purchasing and payment of shipment insurance;
Issuing insurance certificates;
Voiding certificates;
Filing a claim;
Checking the status of a claim; and
Customer service.

These "front office" functions also require "back office" support functions, including:
Data-feeding of customer data;
Performing pre-qualification of customers;
Underwriter referral capability;
Interfacing to accounting departments;
Quote calculation;
Decision to reinsure;
Reinsurance accounting;
Automated notification of various parties when a claim is submitted against a certificate;
Subrogation process tracking; and
Claim adjustment.

Moreover, additional customer support functions can be provided, to assist the customer throughout the process. Examples of this type of support function include:
Instructing the customer regarding claim documentation;
Instructing the customer when data inputted is invalid;
Providing the customer with a list of available surveyors when they report a loss; and
Providing the customer with information regarding his shipment responsibilities.

It is also desirable to generate management reports, such as profitability with respect to commodity, customer region, etc., and also to have claims data reporting capability.

Furthermore, a cargo insurance system should have the ability to analyze the data provided by customers to identify potential problems with shipments or claims. This functionality can be used in the following situations:
Evaluating claims to ensure that dates fall within the legal statutory time limits; and
Red-flagging high-risk commodities and ports to ensure that loss control is able to take preventive measures against loss.

Therefore, an all-encompassing cargo insurance system should include both the underwriting and the claims processes. Importantly, this type of system can be automated, and can be made available on an insurer's website or other point of entry. A fully automated on-line system of this type would have the features summarized below.

Underwriting Process
The underwriting process is composed of five major steps:
1. Quote creation
2. Billing
3. Certificate issuance
4. Reinsurance
5. Loss Control Quote Creation
a. The quote creation process is initiated when a user, preferably a business to-business exchange, accesses the insurer's system application, via a website or other point of entry, to inquire about the insurer's cargo insurance rates. The system requires that users subscribe to the site before any quotes can be generated. Subscription takes place immediately, and only requires very minimal customer information, such as name, company name and email address. When a user goes through the subscription process, any customer data that can be downloaded from the exchange is downloaded. This data will then be used to minimize the amount of data entry required in the creation of documents.

b. When the login process is completed, the system performs a small pre-qualification check, where customer claims and premium payments records are accessed. The system will have the ability to reject some customers, based on data regarding past behavior that may indicate a high rate of claims or unpaid premiums.

c. The quote creation process continues, with data input by the user of information regarding commodity, departure and arrival locations, mode of conveyance, estimated departure date, invoice value, amount insured and currency. Based on the transactional information provided by the user, or the business-to-business exchange, the system performs the quote calculation.

d. The customer can review the quote information provided by the system, and make data modifications while in the quote screen, to see whether changes in the deductible amount or shipment locations can result in a cheaper rate.

Billing
The billing process is initiated when a user accepts a quote that was provided by the system. The system captures all relevant payment detail information, but payment is not processed until the user agrees with the terms of the insurance contract. If the billing process is completed successfully, the insurance certificate can be issued.

Certificate Issuance

The certificate issuance process starts with a system verification of the data that was provided up to that point. If any required data is missing, the user is asked to complete it. The user is then asked to review the terms and conditions of the contract, as well as the data inputted. The user can change any piece of data that does not affect the actual rate that was provided with the quote. If the user changes one of these key fields, the system will have to redo the quote calculation, and the user will receive a warning message. When all terms and conditions are accepted, the payment is processed, and an electronic certificate of insurance is issued. A follow up hard copy of the insurance certificate will be forwarded to the customer, if necessary.

Reinsurance

When the transaction amount is large, there may be a need for the insurer to reinsure part of the certificate value. If this is the case, the system will automatically evaluate the percentage of reinsurance required, as well as the percentage allocated to each re-insurer.

Loss Control

The underwriting process ends with an evaluation by the system of the loss potential, based on commodity and port locations provided by the customer. If there is a high loss potential for this particular transaction, a loss control agent will be contacted by email.

Claims Process

A claim can follow two different basic flows, based on the loss amount reported by the user. While the regular process requires a period of investigation and the creation of a reserve, a fast track claim may be paid automatically by the insurer, after all required documentation has been provided.

e. Once the user has completed a claim notification, the system initiates a series of automated actions:
   1. The user is provided with a list of documents that will be required to process the claim.
   2. A series of notification emails are sent to the claims representative, the underwriter, loss control, and the recovery department, based on such factors as amount of the claim, type of loss and statutory time limits.
   3. If there was reinsurance on the particular transaction, the various re-insurers are also contacted.

In the case of a fast track transaction, or when the investigation process has indicated that the claim is acceptable, the claim is adjusted and paid. If the claim is for more than a certain amount, the file is sent to recovery.

Accordingly, it is an object of the present invention to define a method for automating an on-line system for transacting cargo insurance business, including all the features heretofore described.

SUMMARY OF THE INVENTION

In accordance with an illustrative embodiment of the present invention, a method for an insurer to automate the transaction of cargo insurance business on-line comprises the steps of:
  a) in response to a customer request on-line for insuring a cargo shipment, generating a cargo insurance policy quotation on-line;
  b) upon acceptance of the cargo insurance policy quotation by the customer on-line, generating a bill on-line corresponding to the cargo insurance policy quotation;
  c) upon acceptance of the bill by the customer on-line, issuing a cargo insurance certificate on-line to the customer;
  d) determining a reinsurance portion of the value of the cargo insurance certificate automatically; and
  e) processing on-line any subsequent claim from the customer regarding the cargo shipment.

The disclosed method also includes pre-qualifying the customer, prior to generating the cargo insurance policy quotation, based on the customer's claim and payment history.

Moreover, the cargo insurance policy quotation can be modified on-line by the customer and the insurer, interactively.

Any subsequent claims from the customer regarding the cargo shipment are handled either through an investigative process, or can be settled directly.

Finally, various types of management reports can be generated from the on-line data, including profitability, customer demographics and claim history.

BRIEF DESCRIPTION OF THE DRAWINGS

The invention is described in greater detail below through the example of embodiments in accordance with the present invention, as shown in the following drawings.

DETAILED DESCRIPTION OF PREFERRED EMBODIMENTS OF THE INVENTION

Figure 1:
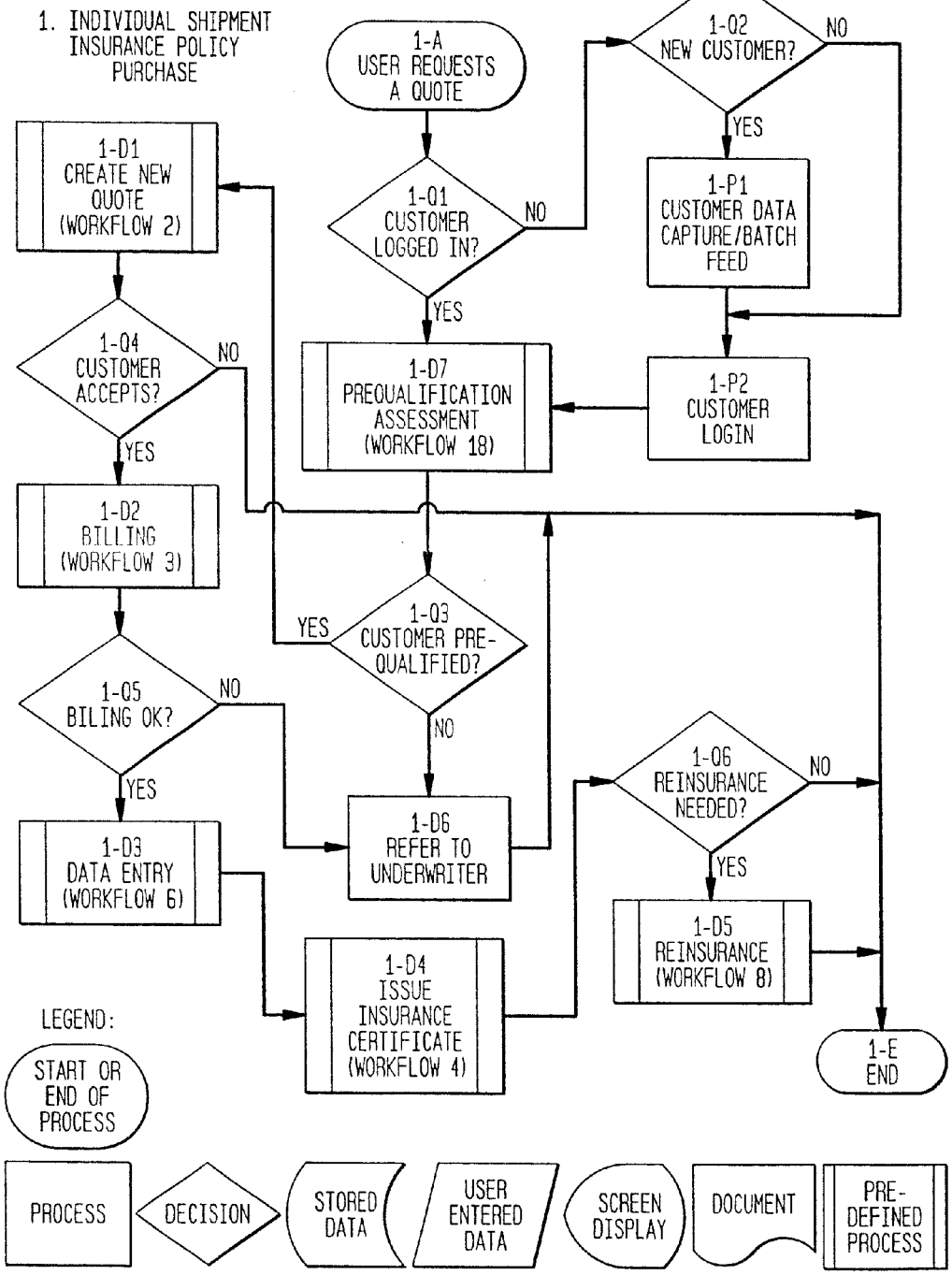
FIG. 1 shows a flow diagram of an insurance policy purchase.

The inventive method is described herein by means of a series of flow diagrams, which cover the following areas:
  f. Individual Shipment Insurance Policy Purchase
  g. Customer Pre-Qualification
  h. Quote Creation
  i. Billing
  j. Insurance Certificate Issuance
  k. Insurance Certificate Voidance
  l. Risk and Reinsurance Evaluation
  m. Shipment Detail Data Entry
  n. Data Validation
  o. Reinsurance
  p. Premium Calculation
  q. Claims
  r. PLA Creation
  s. Claims Notification to Underwriting, Loss Control, and Recovery
t. Claim Acknowledgement
u. Recovery/Subrogation
v. Claims Investigation/Negotiation
w. Claim Payment Each of the workflow processes has associated text, which is linked by the process number. In addition, numbered circle connectors are used in the drawings to link one flowchart to another, and the letter designations in the drawings are defined as follows:

A=Action
D=Defined Procedure
S=System Data Input
O=Output
Doc=Document
Q=Question
P=Process
U=User Data Input
E=End In one embodiment of the above-mentioned invention, the method may be implemented on software. The software may be run on a computer or on a server. Such computer may be connected to a server such as a LAN, WAN, Intranet, VPN, Internet, etc.

The text associated with each flow diagram describes how the process is performed, and includes the following information:

x. User interaction with the system, and any messages that may be displayed;
y. Information on the type of data gathered, and associated source(s);
z. Decision logic that may be involved in performing the process;
aa. For quote calculation, the text includes the necessary data type to be captured, and the rate formula needed for premium calculation; and
bb. Other pre-defined workflows that may be called.

FIG. 1 shows a flow diagram for an individual shipment insurance policy purchase, including a symbol legend at the bottom of the drawing, which applies to the subsequent drawings as well. Table 1, below, provides a description for each numbered item in FIG. 1.

TABLE 1

| Number | Description |
|---|---|
| 1-A | A B2B exchange member is led to the insurer's cargo insurance product offering from the B2B exchange site. The user clicks on "REQUEST NEW QUOTE'. |
| 1-D1 | The quote creation process is completed. [See Workflow 2 - FIG. 2] |
| 1-D2 | The billing process is completed. [See Workflow 3 - FIG. 3] |
| 1-D3 | If the billing was successful, the user completes the remaining data entry requirements regarding the shipment. |
| 1-D4 | The system completes the insurance certificate issuance process. [See Workflow 4 - FIG. 4] |
| 1-D5 | If there is reinsurance, the reinsurance process is started. [See Workflow 8 - FIG. 8] |
| 1-D7 | The system makes an evaluation to determine whether the customer can be extended insurance, considering previous claims, premium payment history, and other relevant criteria. [See Workflow 18 - FIG. 11] |
| 1-E | The transaction is complete. |
| 1-P1 | As part of the user set up, the insurer will download the customer profile directly from the B2B exchange. |
| 1-P2 | The user must enter a valid login ID and password. Password recovery functionality is provided as part of this service. |
| 1-Q1 | Checks whether the customer is logged in. As part of the requirements for using the system, all users have to be registered. Proof of identity is provided via login. |
| 1-Q2 | New customers will have to set up a user ID and password to access the website. |
| 1-Q3 | If the customer pre-qualification is successful, the quote creation process starts. |
| 1-Q4 | The customer clicks on "PURCHASE INSURANCE BUTTON" to accept the quote. Customers with prior agreement to buy insurance will skip this step. |
| 1-Q5 | This step checks whether the billing process was successful. |
| 1-Q6 | Evaluates the need for reinsurance, based on the risk assessment of System Workflow 5, FIGS. 2 and 5. |
| 1-D6 | When the customer does not pre-qualify, or if there is a problem with the billing process, the user is referred to an underwriter. |

Figure 2:
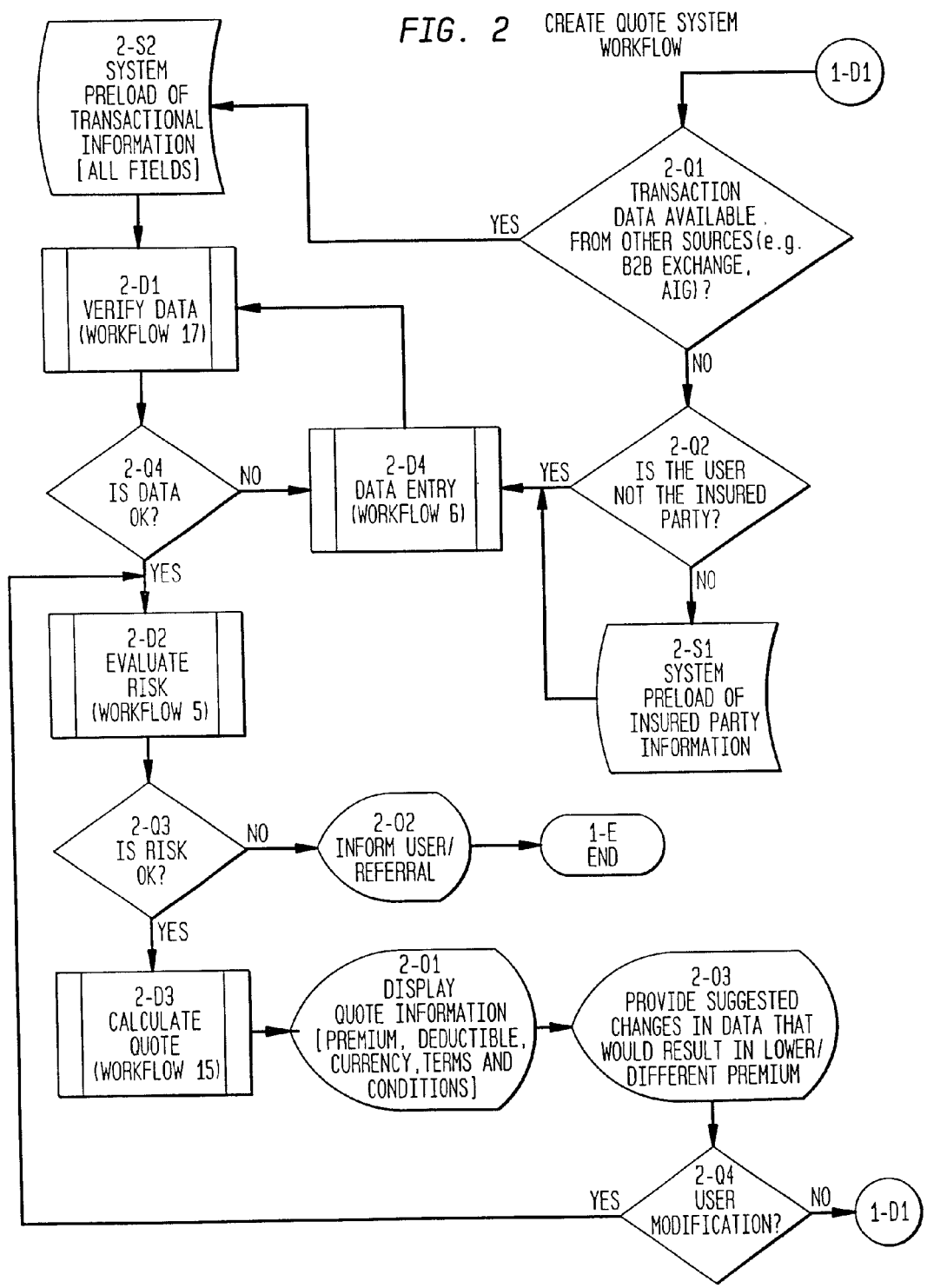
FIG. 2 shows a flow diagram of a quote creation.

FIG. 2 shows a flow diagram for a quote creation process, with corresponding definitions as listed in Table 2, below.

TABLE 2

Figure 5:
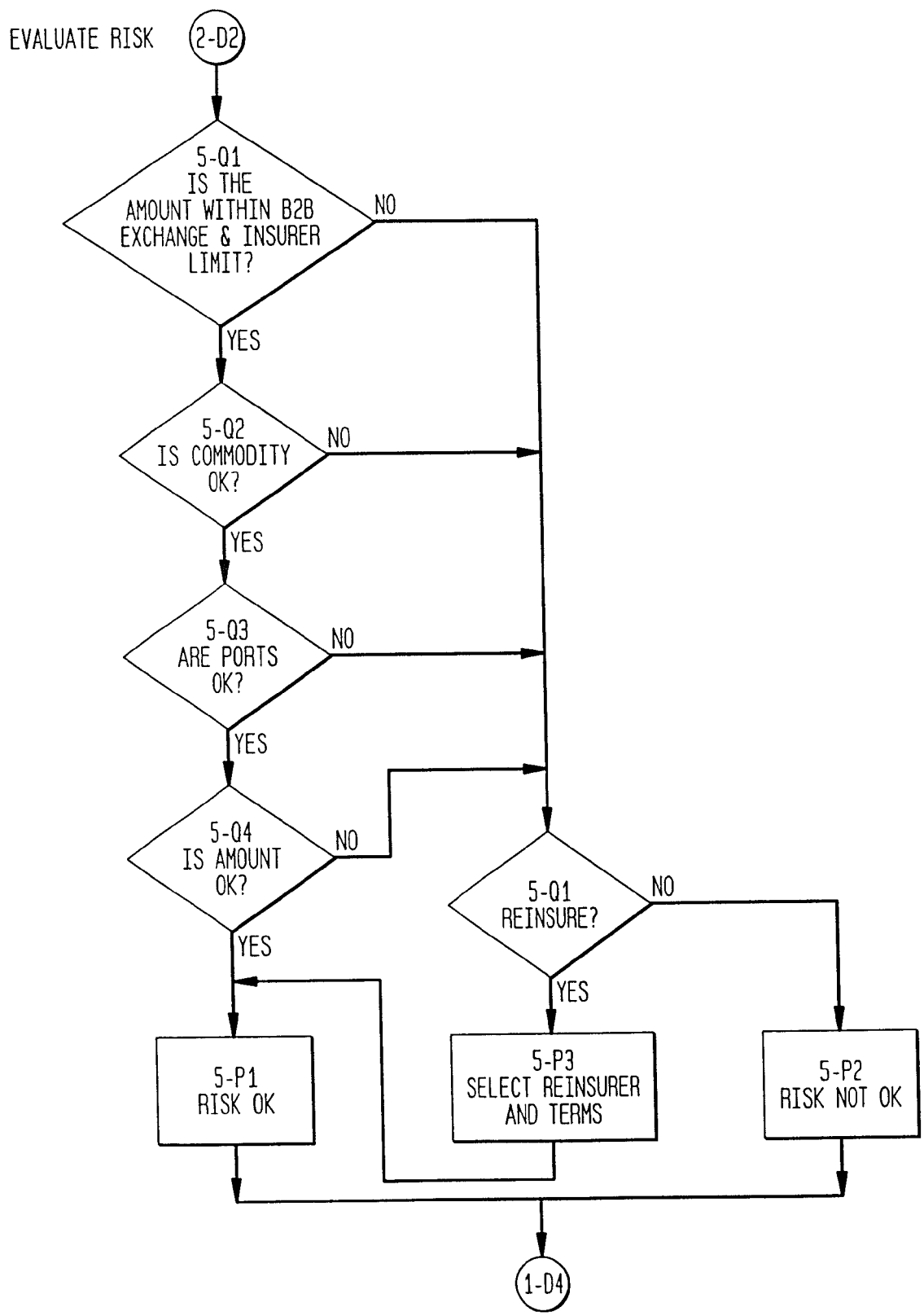
FIG. 5 shows a flow diagram of risk evaluation.
Figure 6:
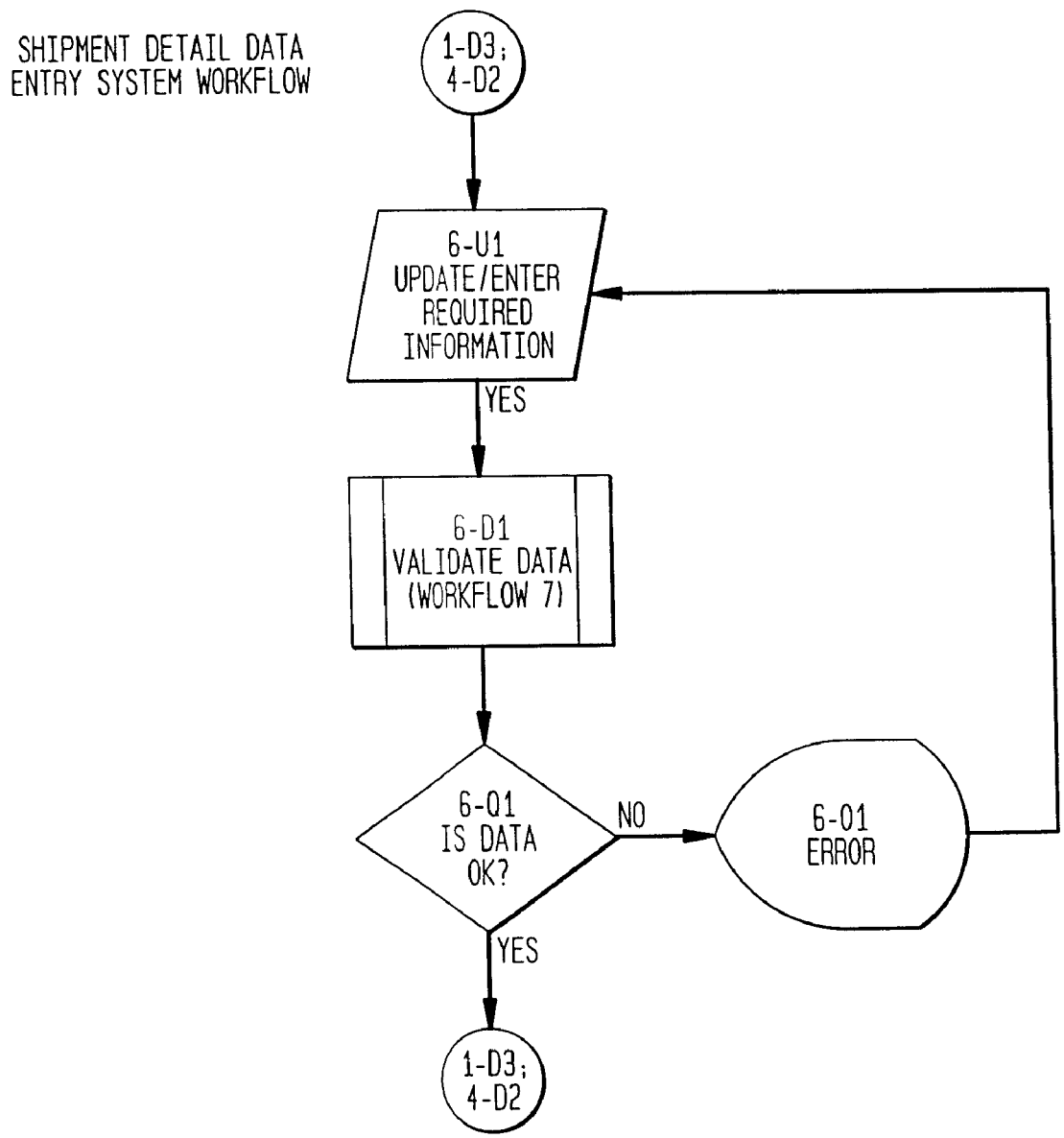
FIG. 6 shows a flow diagram of a shipment data entry.
Figure 9:
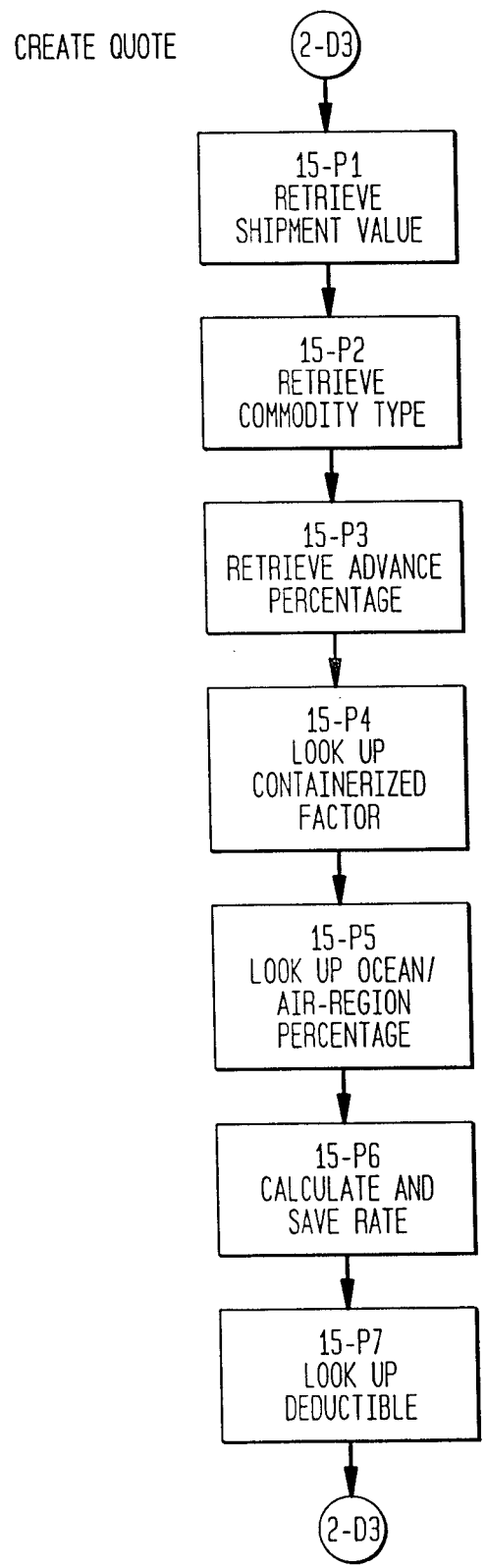
FIG. 9 shows a flow diagram of quote creation detail.
Figure 18:
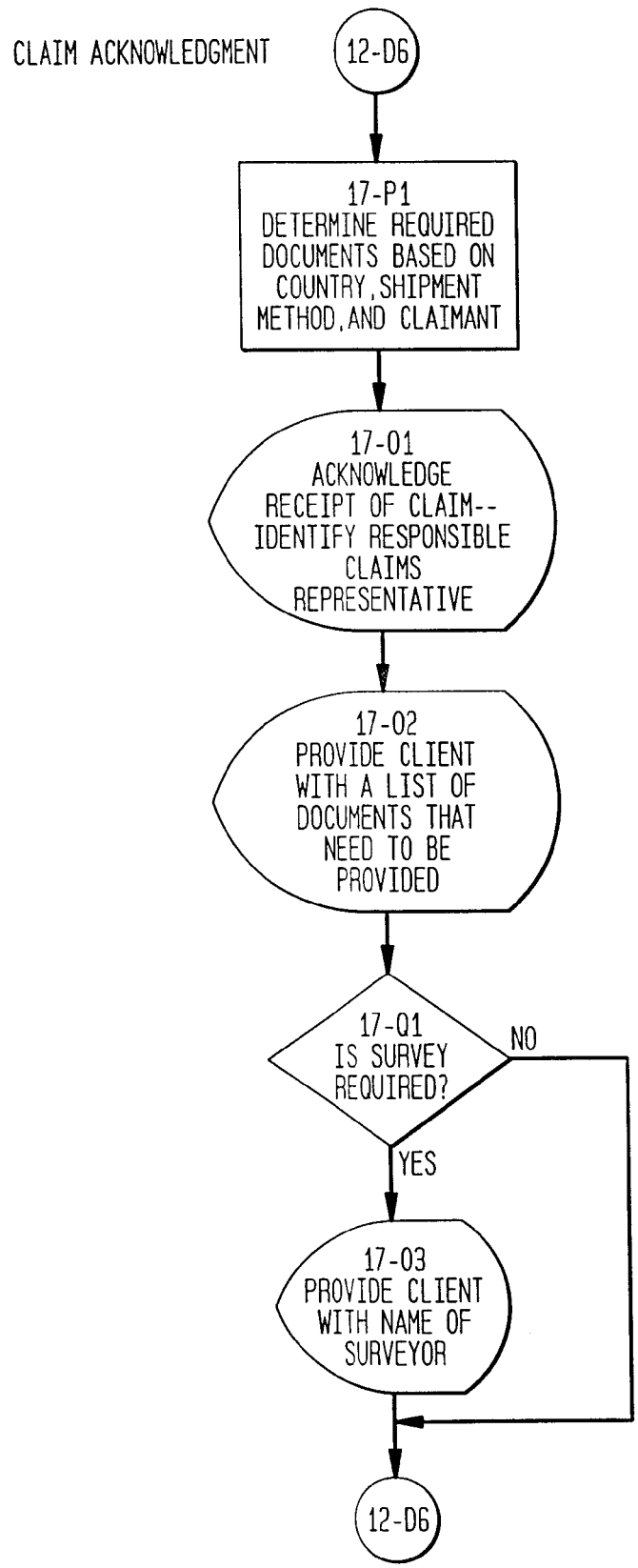
FIG. 18 shows a flow diagram of claim acknowledgment.

| | |
|---|---|
| 1-E | If the risk is too high, and reinsurance is not available, the user is referred to an underwriter, and the process is aborted. |
| 2-D1 | The data is checked for content. [See Workflow 17 - FIG. 18] |
| 2-D2 | The risk evaluation process is performed. [See Workflow 5 - FIG. 5] |
| 2-D3 | The quote is calculated and saved, so that it will be available the next time the user logs on to the system. [See Workflow 15 - FIG. 9] |
| 2-D4 | The user performs data entry of the required fields for a quote to be created successfully. [See Workflow 6 - FIG. 6] |
| 2-O1 | The quote information is displayed - along with suggestions as to how to make it lower or different, in "what-if" scenarios. The user is able to make modifications on the spot. Results of changes in the fields result in a new quoted amount instantaneously. The value of the shipment is the only field that cannot be modified. |
| 2-O2 | When the insurer can not provide insurance for this shipment, a referral is provided to the user. |

TABLE 2-continued

| | |
|---|---|
| 2-O3 | The quote information is displayed, along with suggestions as to how to make it lower. The user is able to make modifications on the spot. Results of changes in the fields result in a new quoted amount instantaneously. |
| 2-Q1 | Some B2B exchanges may provide the ability to download relevant transaction information directly. This would be a shortcut for the user, who would not have to perform as much data entry. |
| 2-Q2 | The user is asked whether he is the insured. |
| 2-Q3 | If the risk was evaluated to be too high, the user is informed, and a referral is made. |
| 2-Q4 | If the data is invalid or incomplete, the user returns to the data input screen. |
| 2-S1 | When the transaction is not downloaded from the exchange, it is still possible for the user to populate the insurer party information if the user is the insured party. |
| 2-S2 | The transaction data is downloaded from the exchange. |

Figure 3:
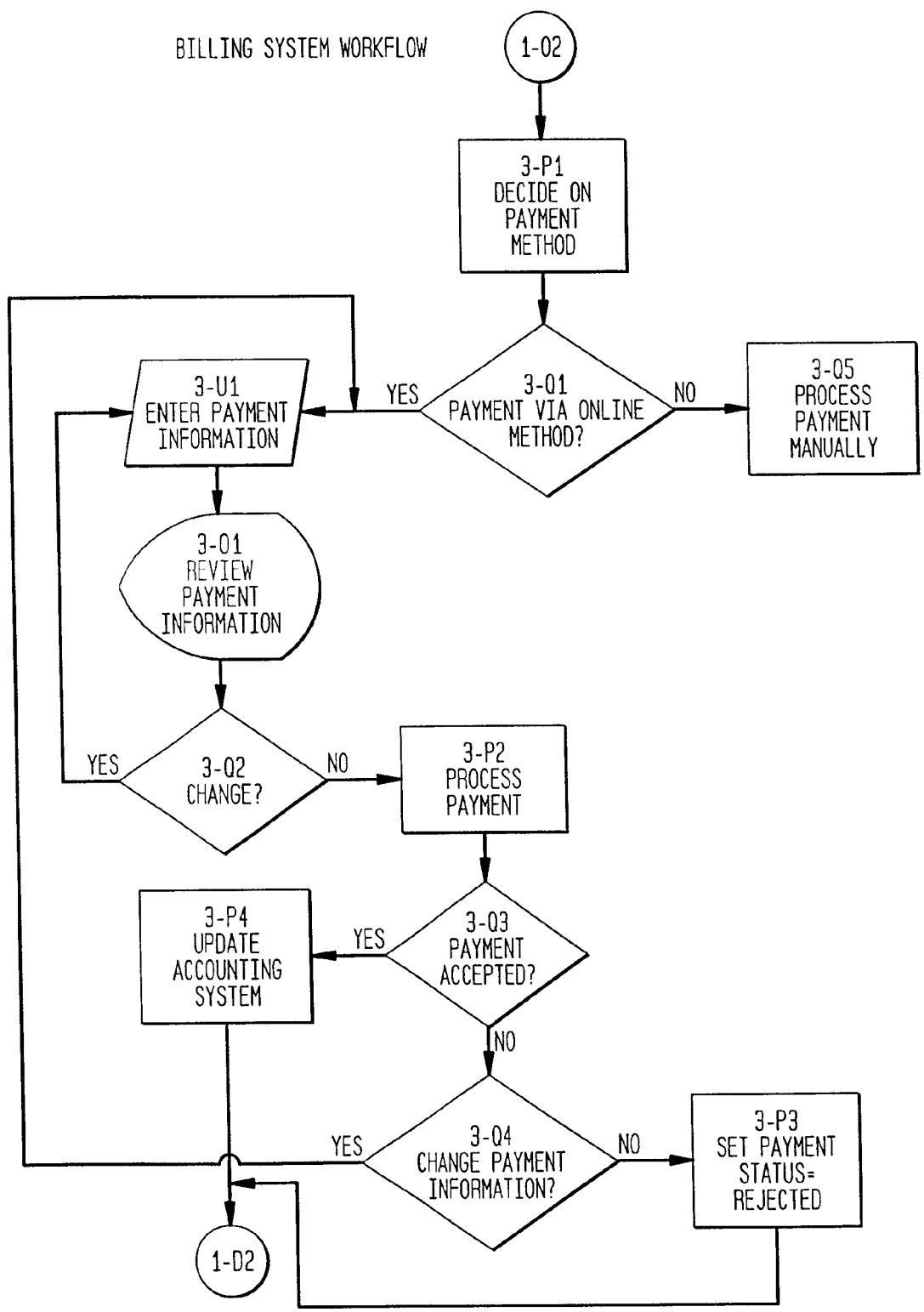
FIG. 3 shows a flow diagram of a billing process.

FIG. 3 shows a flow diagram for a billing process, with corresponding definitions as listed in Table 3, below.

TABLE 3

| | |
|---|---|
| 3-O1 | The user reviews the payment information entered. |
| 3-P1 | Payment method used will depend on the insured's country, as well as on the terms of agreement with the B2B exchange. Several payment options could be offered to the same customer. |
| 3-P2 | Payment is processed. |
| 3-P3 | If payment was not completed successfully, then the transaction is aborted. |
| 3-Q1 | Inquires if the user will use an online or offline method of payment. |
| 3-Q2 | The user is given the possibility to change the credit card information, if it was not entered properly. |
| 3-Q3 | If payment is successfully completed, the billing process is complete. If not, the user can modify the payment data that was previously entered. |
| 3-Q4 | Inquires whether the user wishes to modify the payment information previously entered. This can only take place if the payment was unsuccessful. |
| 3-Q5 | Process payment manually. The user will be instructed to send payment to an address, or to make payment in person. Necessary information and disclaimers will be provided. |
| 3-U1 | If online method of payment will be used, the user will enter the appropriate information. (This information could be kept on file, in which case this step would be bypassed.] |

Figure 4:
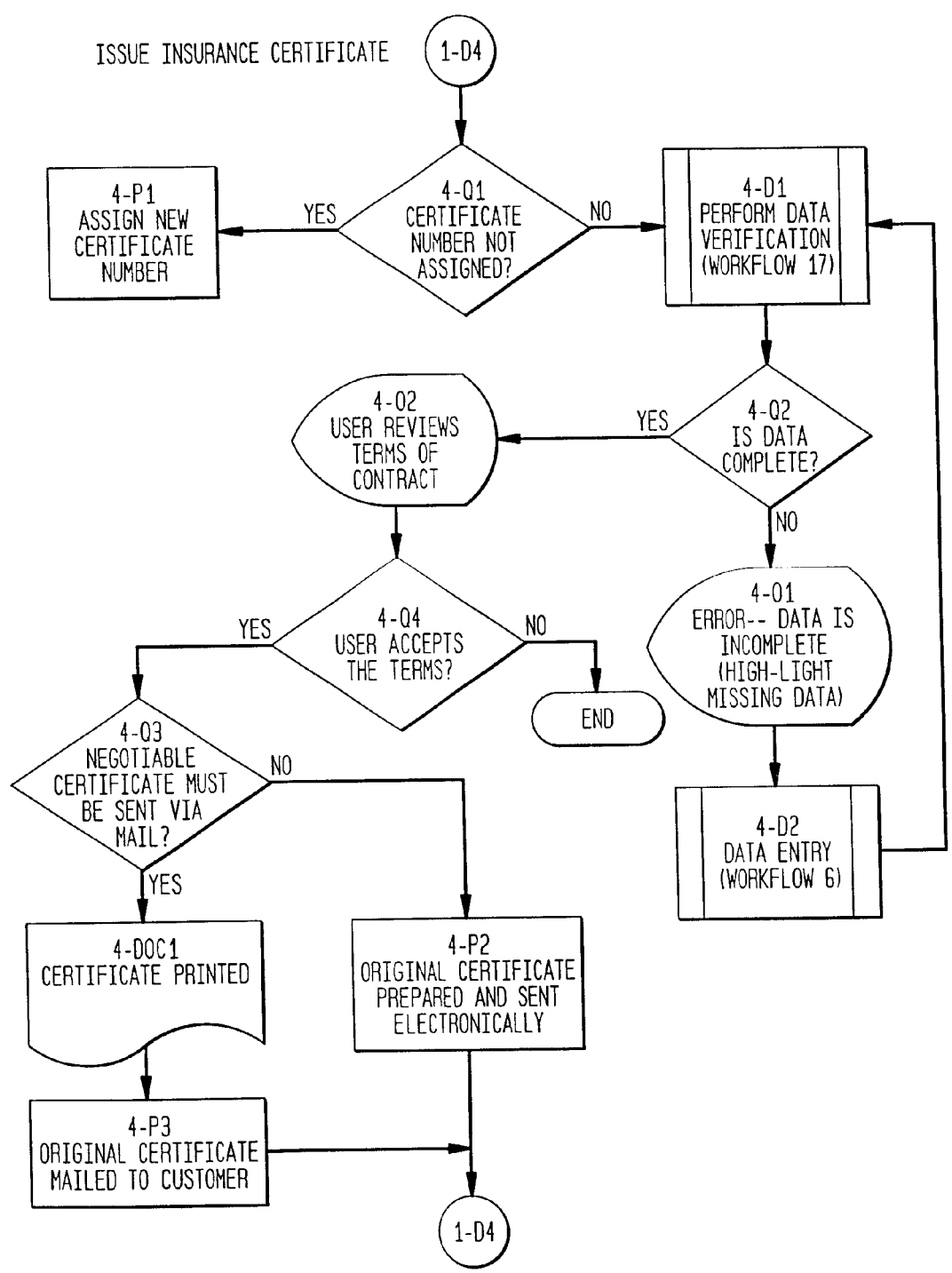
FIG. 4 shows a flow diagram of a certificate issuance.

FIG. 4 shows a flow diagram for issuing an insurance certificate, with corresponding definitions as listed in Table 4, below.

TABLE 4

| | |
|---|---|
| 4-O1 | The user receives a warning that not all information was provided. The missing data is highlighted. |
| 4-D1 | The system verifies that the data is valid and complete [Workflow 17 - FIG. 18] |
| 4-D2 | If the user decides to complete the data, the shipment detail data entry process starts. [See Workflow 6 - FIG. 6] |
| 4-DOC1 | The certificate of insurance is printed directly by the user. Certificate to contain instructions on the use of the automated claims system, or an alternative filing method. |
| 4-O2 | The user reviews the data entered so far, as well as the insurer's terms. |
| 4-P1 | The system assigns a new insurance certificate number. [This could be a sequential number.] |
| 4-P2 | The insurance certificate is issued, and sent to the user electronically. |
| 4-P3 | The original certificate is mailed to the user, based on legal requirements. |
| 4-Q1 | This process may have already been started. If this is the case, the certificate number is assigned. |
| 4-Q2 | If data is completed, the process continues; if not, the user receives an error message, and data must be completed or corrected before the insurance certificate is issued. |
| 4-Q4 | If the user agrees with the terms and signs, the insurance certificate is issued. If the user does not sign, the process ends. |

FIG. 5 shows a flow diagram for evaluating risk, with corresponding definitions as listed in Table 5, below.

TABLE 5

| | |
|---|---|
| 5-P1 | Process outcome is risk is OK. |
| 5-P2 | Process outcome is risk is too high. |
| 5-P3 | A re-insurer is selected, based on criteria and transaction data. |

TABLE 5-continued

| | |
|---|---|
| 5-Q1 | Limits are checked. |
| 5-Q1 | If re-insurance is possible based on these conditions, a re-insurer is identified, and the process continues. |
| 5-Q2 | The commodity is checked against the list of restricted commodities. |

TABLE 5-continued

| | |
|---|---|
| 5-Q3 | The from and to ports are checked against the list of restricted ports. |
| 5-Q4 | Additional rules as defined. |

FIG. 6 shows a flow diagram for shipment detail data, with corresponding definitions as listed in Table 6, below.

TABLE 6

Figure 7:
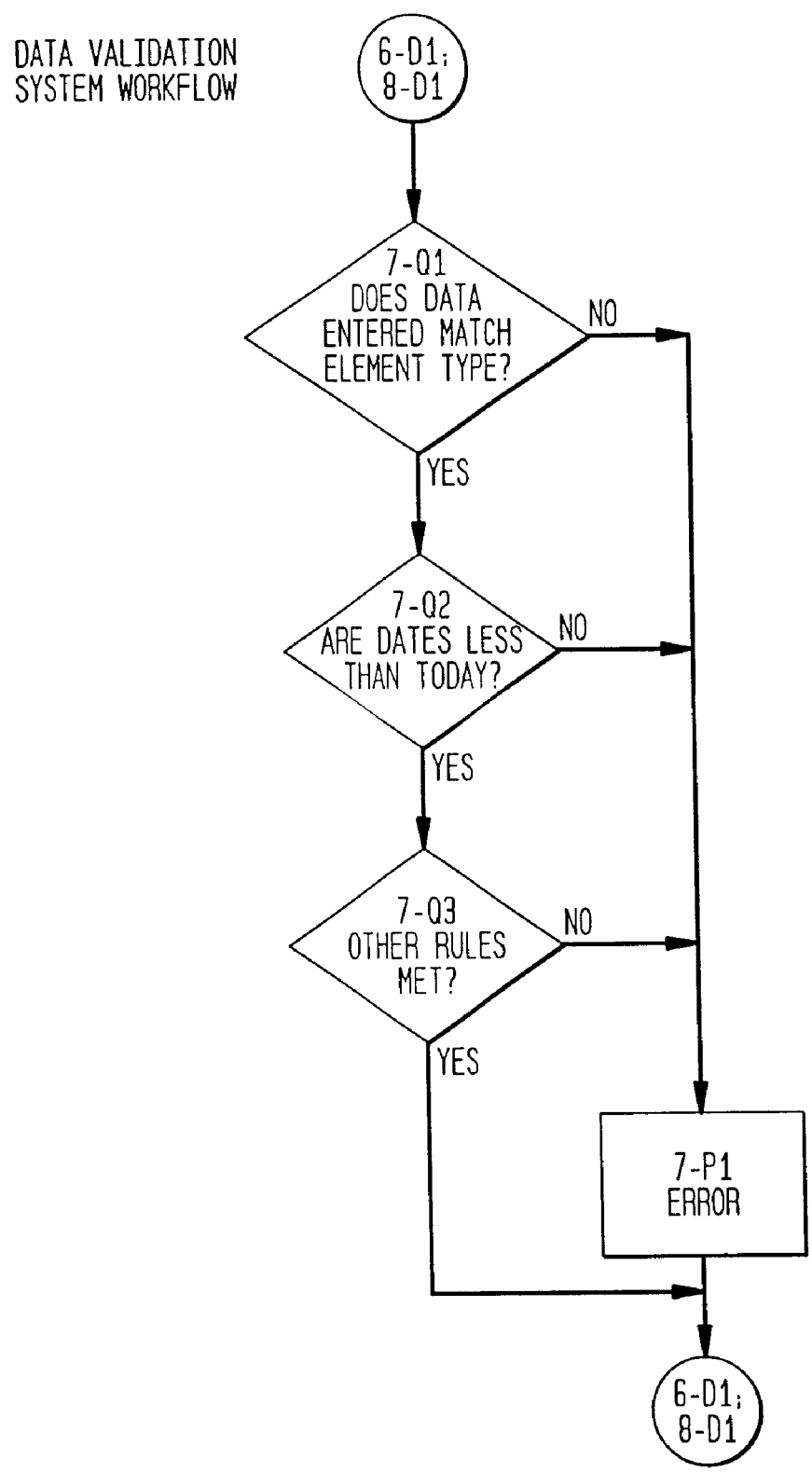
FIG. 7 shows a flow diagram of data validation.

| | |
|---|---|
| 6-U1 | Data is inputted |
| 6-D1 | Data is validated The system checks the data entered against a specific list of rules. [Workflow 7 - FIG. 7] |
| 6-Q1 | If the data validation process is successful, the process ends. If it is not successful, the user receives a warning message, and is asked to correct the invalid data. [Invalid fields will be highlighted in red.] |
| 6-O1 | An error message is received by the user, along with the fields that must be corrected. |

FIG. 7 shows a flow diagram for data validation, with corresponding definitions as listed in Table 7, below.

TABLE 7

| | |
|---|---|
| 7-P1 | If the validation fails, the user receives an error message, and invalid fields are highlighted in red. |
| 7-Q1 | Data types are checked (valid dates, number into numeric fields, etc.). |
| 7-Q2 | Dates are validated. [Shipment date later than today, not after X months from today's date, and need to accommodate for time differences] |
| 7-Q3 | Other validation rules as defined. |

Figure 8:
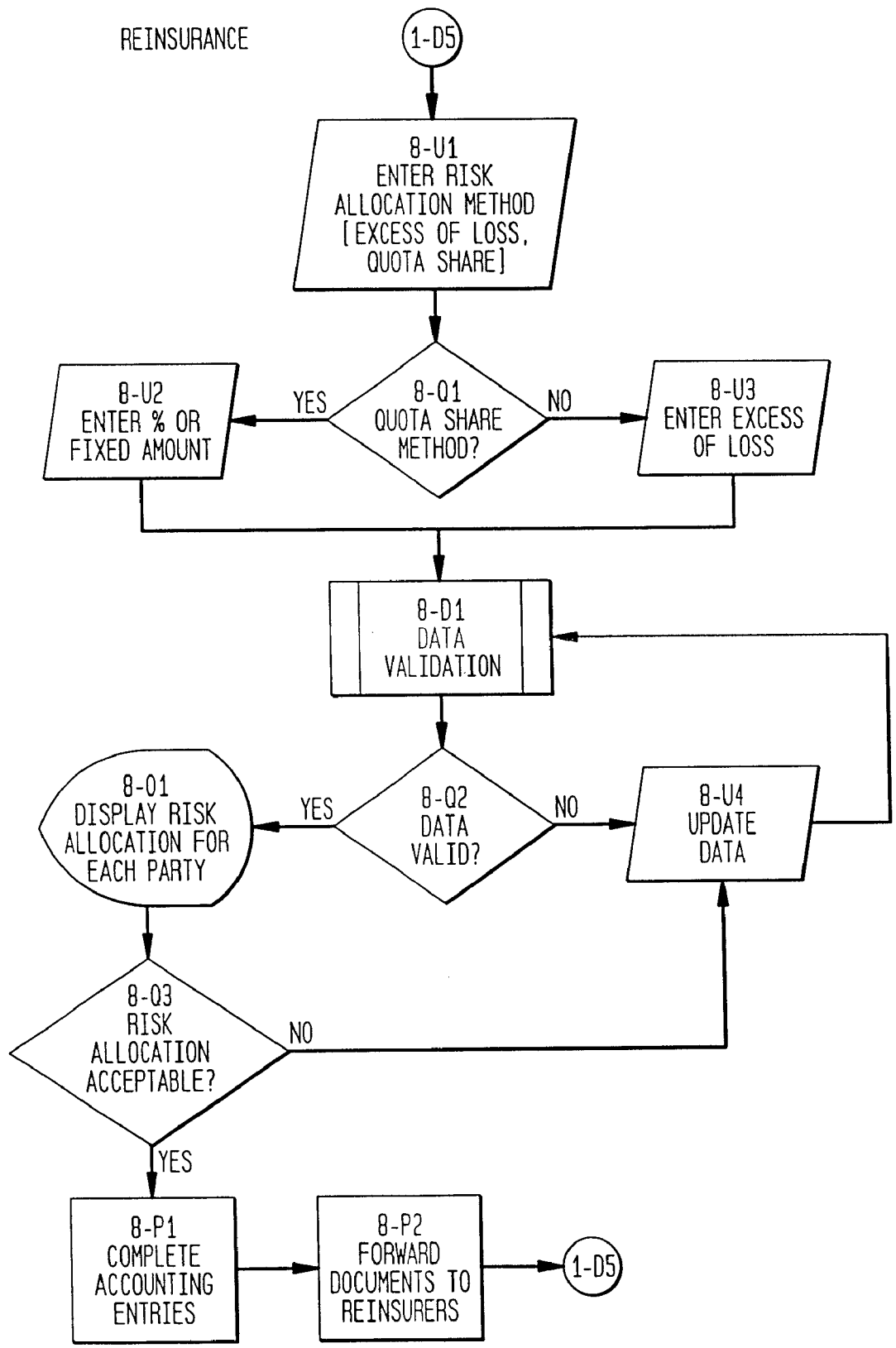
FIG. 8 shows a flow diagram of reinsurance evaluation.

FIG. 8 shows a flow diagram for reinsurance, with corresponding definitions as listed in Table 8, below.

TABLE 8

| | |
|---|---|
| 8-D1 | Data is validated. [See Workflow 7 - FIG. 7] |
| 8-O1 | When data entry is completed, the user reviews the data entered, and verifies the allocation amounts. |
| 8-P1 | Accounting entries as defined. |
| 8-P2 | The details of the transaction are forwarded to the re-insurers. |
| 8-Q1 | There are two different data input requirements, depending on whether the risk allocation method is excess of loss, or quota. |
| 8-Q2 | If data is valid, the user can continue. If not, an error message is displayed, and the user must correct it before continuing. |
| 8-Q3 | If the user is satisfied with the data entered, the process continues. If he or she needs to make modifications, it is possible to do so before committing the changes to the database. |
| 8-U1 | The underwriter identifies the risk allocation method. [Excess of loss, quota share] |
| 8-U2 | If the risk allocation method is quota, a percentage of the share can be allocated, or the allocation can be made using a fixed amount. |
| 8-U3 | If the excess of loss method is used, the threshold amount has to be entered. |
| 8-U4 | The user updates the data. |

FIG. 9 shows a flow diagram for quote calculation, with corresponding definitions as listed in Table 9, below.

TABLE 9

| | |
|---|---|
| 15-P1 | The quote is calculated based on the following information: Value of the goods; |
| 15-P2 | The type of commodity shipped; |
| 15-P3 | Advance percentage determined via table look up; |
| 15-P4 | Whether the goods are containerized or not; and |
| 15-P5 | The shipment method and the region where the goods are shipped to and from. |
| 15-P6 | The rate is calculated based on the following formula: Premium due = Amount insured * containerized factor * packaging factor * commodity factor * ocean/air-region %. |

TABLE 9-continued

| | |
|---|---|
| | The final premium is subject to a minimum amount. The rate is saved so that it will be available in subsequent user sessions. NOTE: Rating formula can be modified as required. |
| 15-P7 | The deductible that applies is taken from the tables that list the appropriate rate, according to the information specified above. |

Figure 10:
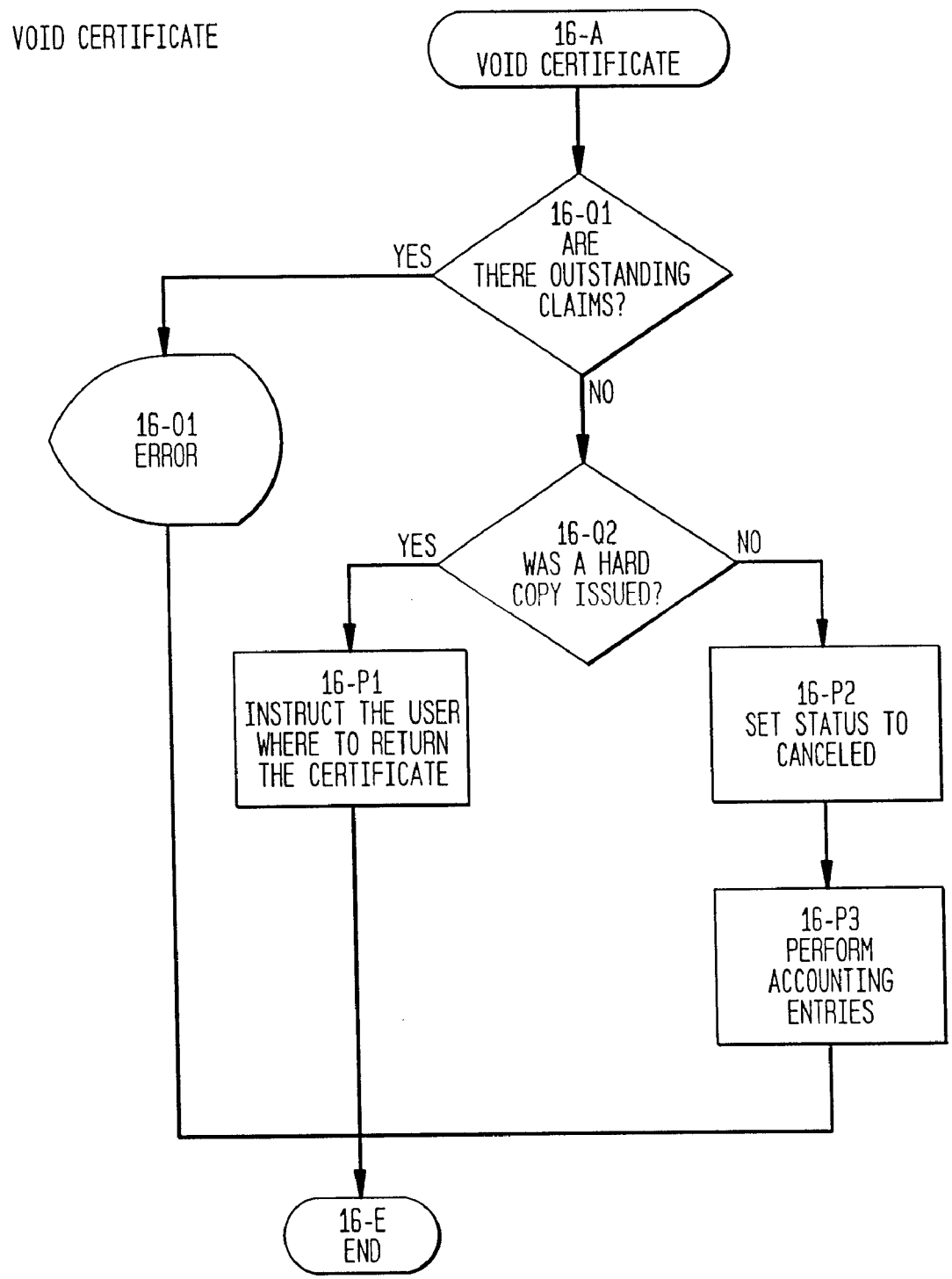
FIG. 10 shows a flow diagram of certificate voidance.

FIG. 10 shows a flow diagram for voiding a certificate, with corresponding definitions as listed in Table 10, below.

TABLE 10

| | |
|---|---|
| 16-A | The void certificate process takes place when the certificate has been issued; the user needs a change in the terms. |
| 16-E | The process is ended. |
| 16-O1 | If there are outstanding or paid claims against this certificate, the certificate cannot be voided. The user is instructed that the certificate cannot be voided. |
| 16-P1 | If a hard copy of the insurance certificate was issued, the user must return it before the document can be voided. |
| 16-P2 | If there are no outstanding hard copies, the status of the certificate is void or canceled. |
| 16-P3 | Necessary accounting entries are completed to adjust accounts receivable or payable. |
| 16-Q1 | If there are outstanding or paid claims against this certificate, the certificate cannot be voided. |

Figure 11:
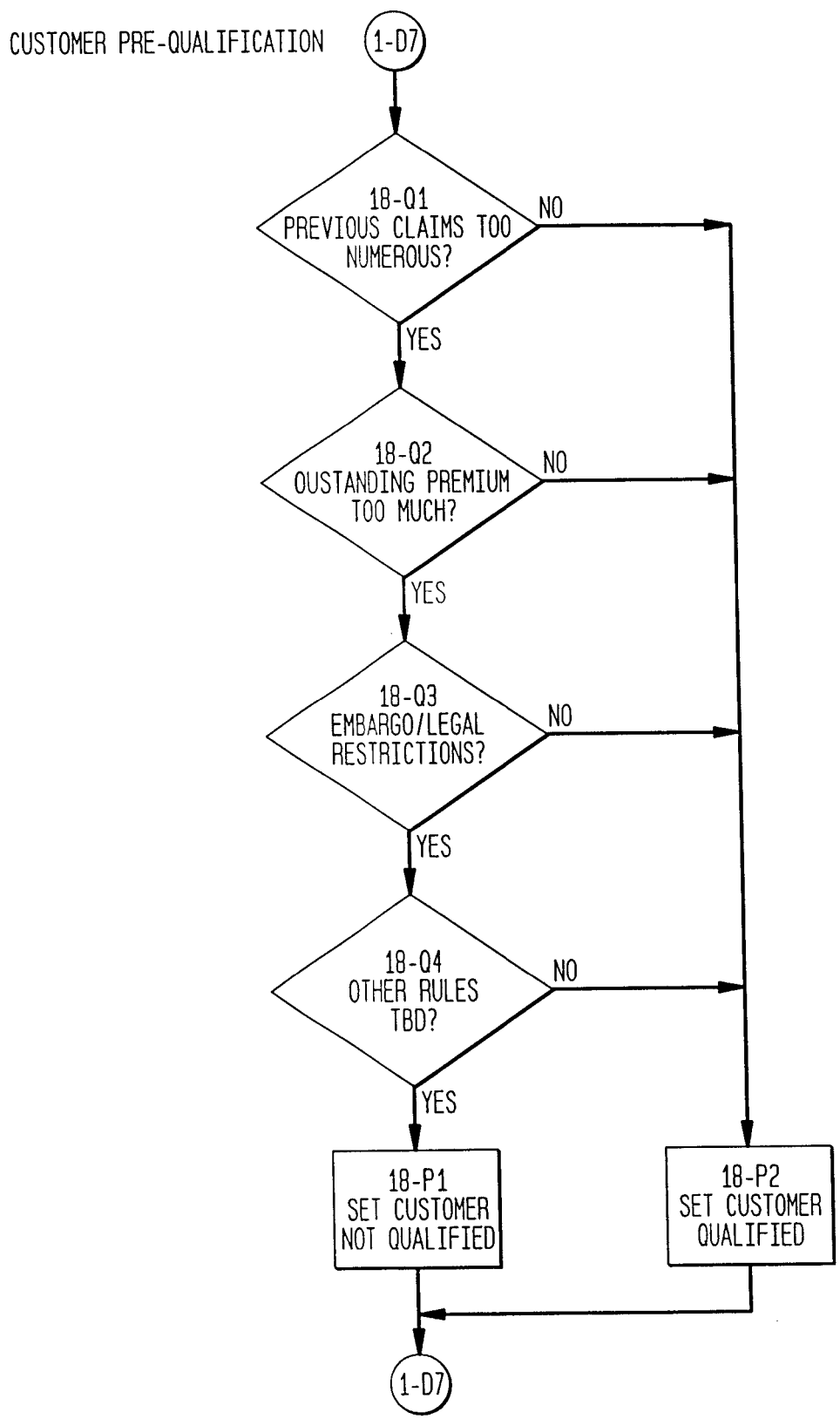
FIG. 11 shows a flow diagram of customer pre-qualification.

FIG. 11 shows a flow diagram for customer pre-qualification, with corresponding definitions as listed in Table 11, below.

TABLE 11

| | |
|---|---|
| 18-Q1 | The customer pre-qualification process requires that the total of previous claims doesn't exceed a certain number or amount. |

TABLE 11-continued

| | |
|---|---|
| 18-Q2 | The customer cannot have unpaid premiums exceeding a certain amount. |
| 18-Q3 | If the customer's country of domicile has legal restrictions, or is on the embargo list, the customer is not qualified. |
| 18-Q4 | Other criteria can be added, as desired. |
| 18-P1 | The customer does not qualify. |
| 18-P2 | The customer qualifies for requesting a quote. |

Figure 12:
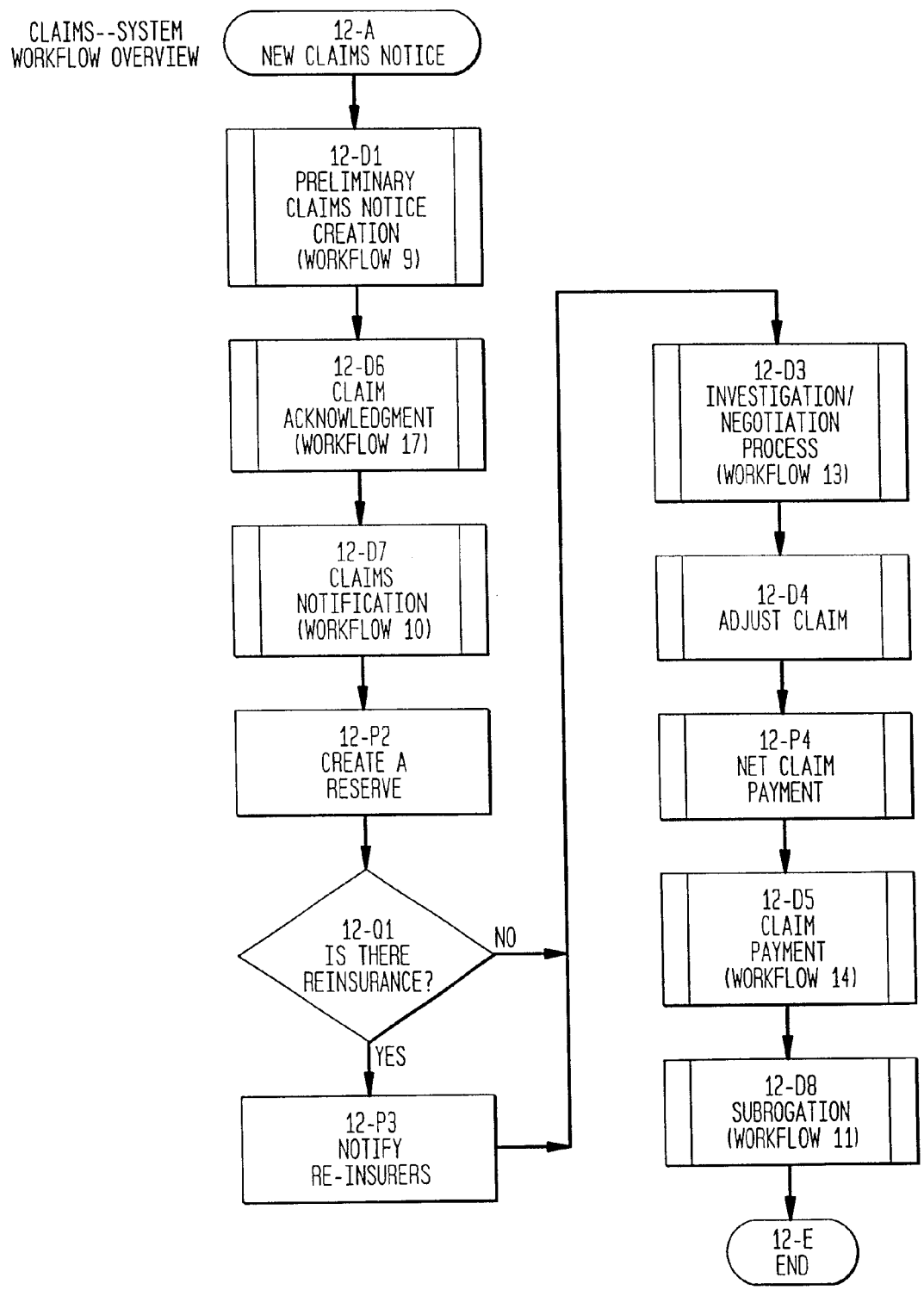
FIG. 12 shows a flow diagram of a claims process overview.

FIG. 12 shows a flow diagram for the claims system overview, with corresponding definitions as listed in Table 12, below.

TABLE 12

| | |
|---|---|
| 12-D1 | The user completes a claims notice. Legal disclaimer needed to let the customer know that acknowledgement of claims notice and associated documents does not constitute an agreement to pay the claims. Legal disclaimers needed on all screens. [See Workflow 9 - FIG. 13] |
| 12-D3 | The investigation process starts. [See Workflow 13 - FIG. 16] |
| 12-D4 | The claim is adjusted. |
| 12-D5 | The claim payment process is initiated. [See Workflow 14 - FIG. 17] |
| 12-D6 | The system acknowledges that a claim has been successfully received, and further information is given to the user regarding how to proceed with the claim. [See workflow 17 - FIG. 18] |
| 12-D7 | The system notifies the various entities that need to be involved with the claim. [See workflow 10 - FIG. 14] |
| 12-D8 | The subrogation process is initiated once the claim is settled. [See workflow 11 - FIG. 15] |
| 12-P2 | A reserve is created. |
| 12-P3 | If reinsurance exists for specific certificate, the re-insurers are notified of the claim. [Documents are forwarded electronically.] |
| 12-P4 | The claim payment is netted. |
| 12-Q1 | If reinsurance exists, then reinsurers must be informed of the claim, and the amount that they will be responsible to pay. |
| 12-A | The user clicks on the "FILE CLAIM" button on the browser. |

Figure 13:
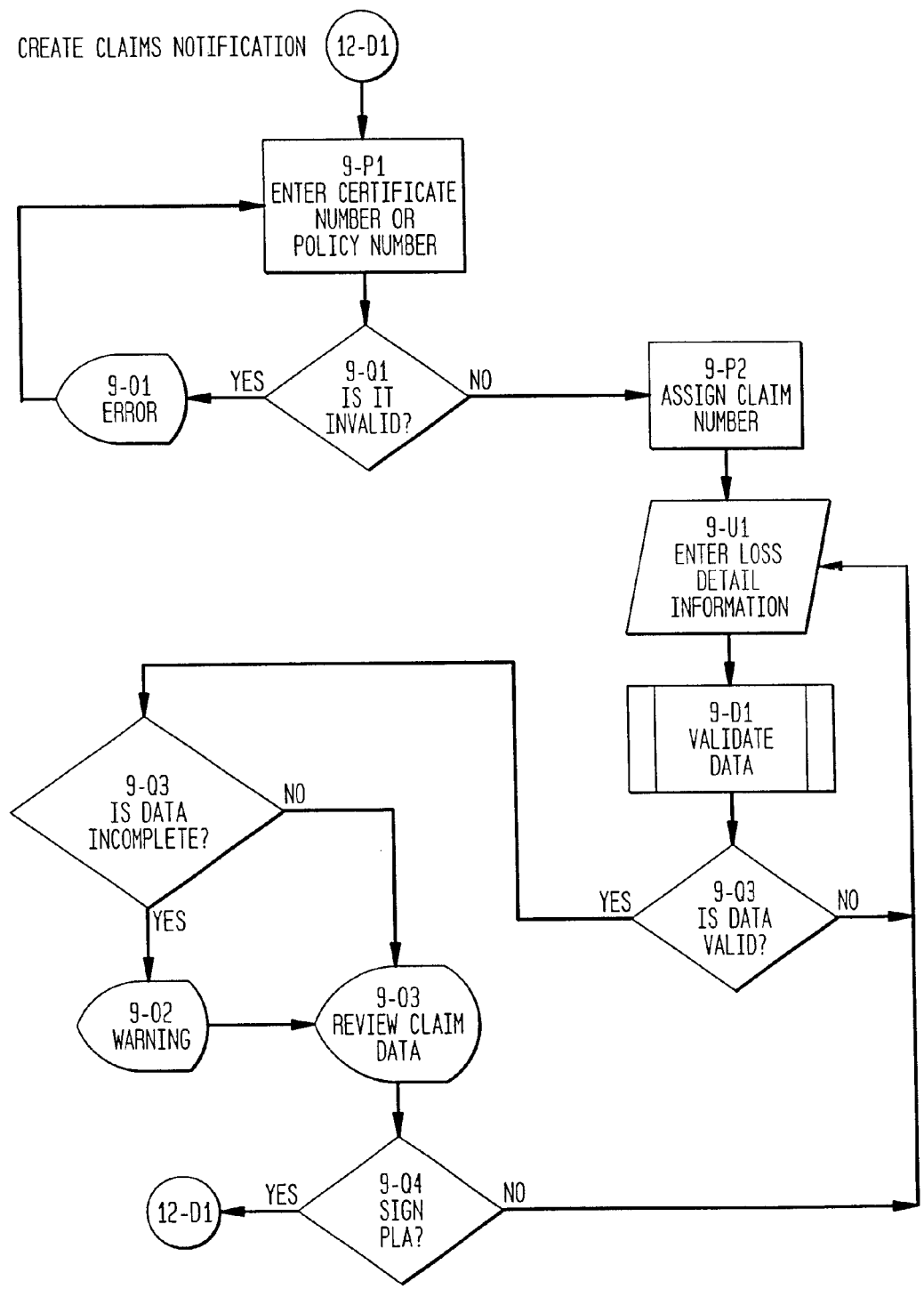
FIG. 13 shows a flow diagram of claims notification creation.

FIG. 13 shows a flow diagram for claims notification, with corresponding definitions as listed in Table 13, below.

TABLE 13

| | |
|---|---|
| 9-D1 | The data validation process is initiated. |
| 9-O1 | The user receives an error indicating the certificate number entered is incorrect, and the user is asked to try again. |
| 9-O2 | If the data provided by the user is not complete, he or she receives a warning message indicating that it will have to be provided later. This does not stop the user from filing the claim. |
| 9-O3 | The user reviews the claim data for the purpose of signing the claim. |
| 9-P1 | The user enters the certificate number. |
| 9-P2 | A claim number is assigned by the system. |
| 9-Q1 | If the certificate is valid, a claim document is created; if it is not, the user receives an error. |
| 9-Q2 | If the data is valid, the user can continue. If it is invalid, the user must correct the error. |
| 9-Q3 | If the data is incomplete, the user receives a warning message. The user does not need to complete all of the data in order to file a claim. |
| 9-Q4 | If the user signs the PLA, the process continues; otherwise, the user is allowed to update the information provided so far. |
| 9-U1 | The user enters the loss detail information. This includes text information regarding the loss, dates, and so forth. |

Figure 14:
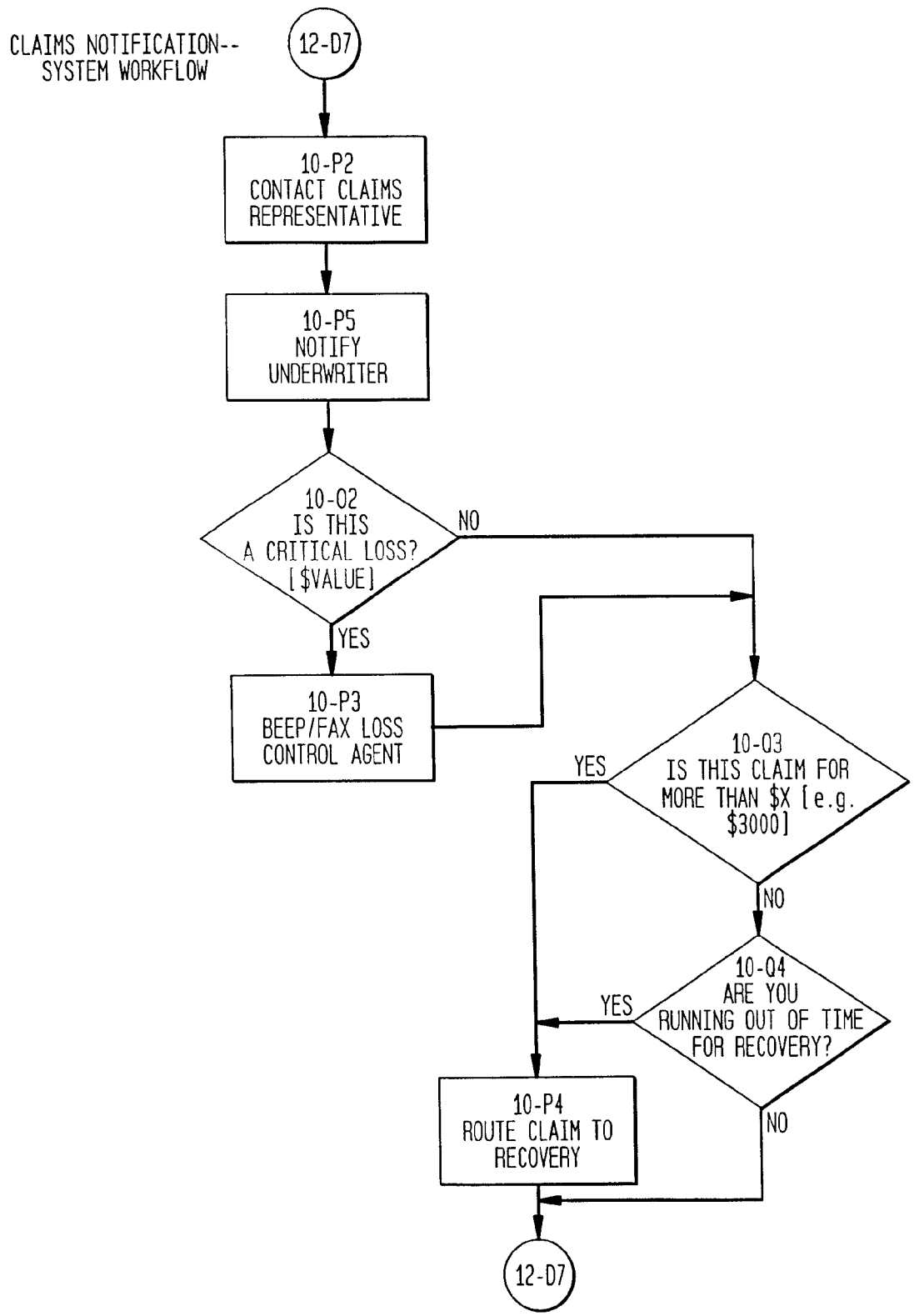
FIG. 14 shows a flow diagram of claims notification processing.

FIG. 14 shows a flow diagram for the claims notification system workflow, with corresponding definitions as listed in Table 14, below.

TABLE 14

| | |
|---|---|
| 10-P2 | A Claims representative is assigned to this claim, based on predetermined criteria. |
| 10-P3 | The loss control agent for the region where the loss occurred is contacted urgently. |
| 10-P4 | The recovery department is notified of claims that are received, where the time allowed for recovery is short. |
| 10-P5 | The underwriter is notified. [Rules can be defined to notify the underwriter only in specific cases; e.g., dollar amounts above $X, commodities, etc.] |
| 10-Q3 | If the claim is more than a predetermined amount, the recovery department needs to be notified. |
| 10-Q4 | The shipping document date is checked against a set of rules, to determine how much time remains for recovery. If it is less than a month, the recovery department is contacted. |
| 10-Q2 | Is this loss higher than a certain dollar amount? If yes, loss control must be involved. |

Figure 15:
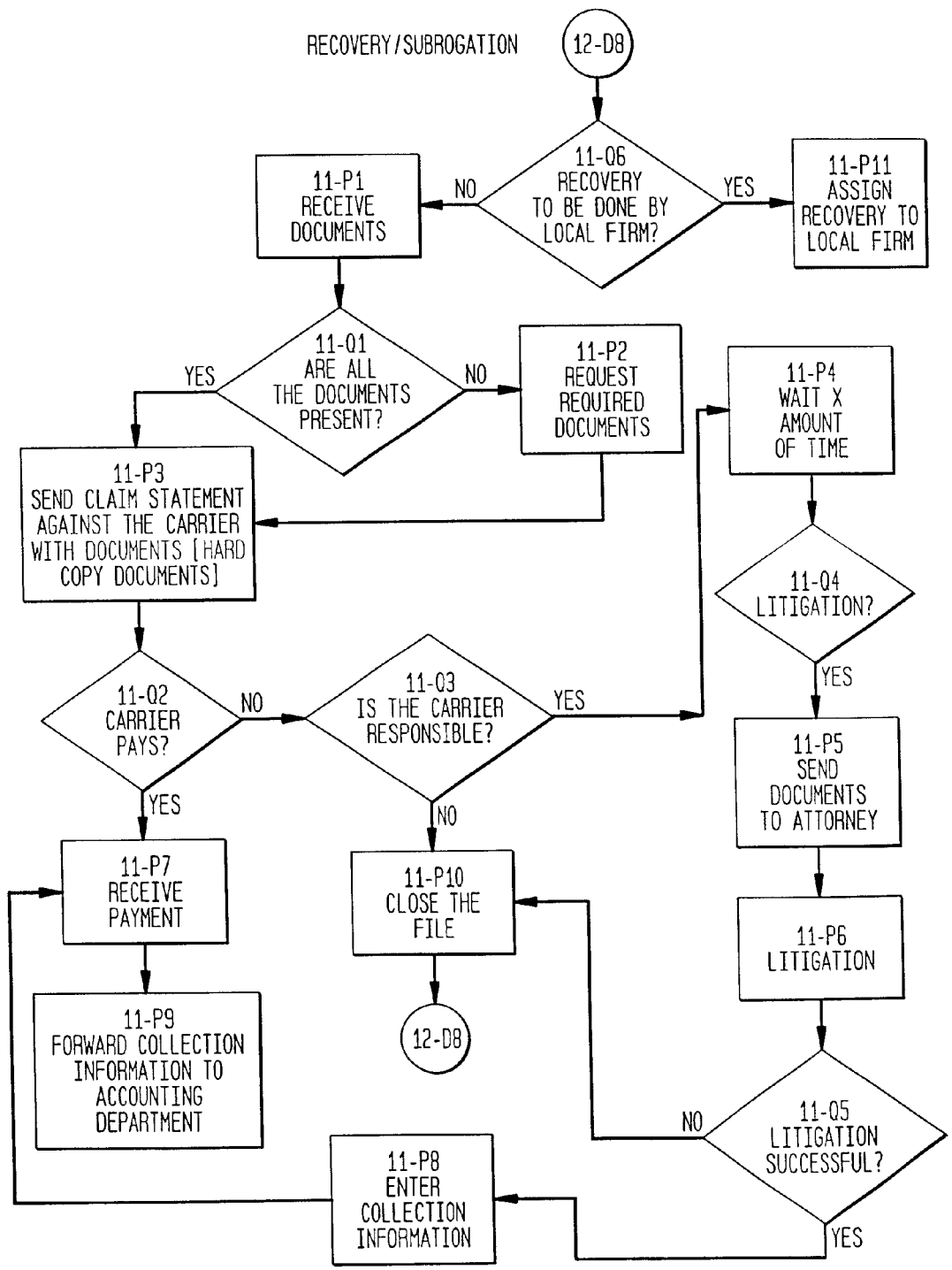
FIG. 15 shows a flow diagram of recovery/subrogation.

FIG. 15 shows a flow diagram for recovery/subrogation, with corresponding definitions as listed in Table 15, below.

TABLE 15

| | |
|---|---|
| 11-P1 | The documents are received by the subrogation department. |
| 11-P10 | The file is closed, and the reason for closing is specified. |
| 11-P11 | If a local firm is required to handle the recovery, the file is sent to them. |
| 11-P2 | If there are documents missing, the system red flags them. |
| 11-P3 | If all documents have been collected, the claim is sent to the carrier with the hard copy documents. |
| 11-P4 | The carrier is usually given a certain amount of time to complete payment before the litigation procedure is started. |
| 11-P5 | If a legal procedure is started, the file is sent to the attorney. |
| 11-P6 | The litigation procedure starts. |
| 11-P7 | The payment is received. |
| 11-P8 | The collection amount is entered into the system. |
| 11-P9 | The accounting department receives the payment notification. |
| 11-Q1 | The system checks to see whether all needed documents have been received. |
| 11-Q2 | There are three case scenarios.<br>1. The carrier decides to pay;<br>2. The carrier does not pay, but the file is closed, because they are not responsible; and<br>3. The carrier does not pay, and a legal procedure is started. |
| 11-Q3 | see 11-Q2 |
| 11-Q4 | If the carrier does not pay, it is possible to forgo the right to sue him, because of the negligible amount of the claim. |
| 11-Q5 | If litigation is successful, the amount collected needs to be entered into the system. If no money is collected, the file is closed. The reason for closing the file is inputted into the system. |
| 11-Q6 | The system determines who must handle the recovery. |

Figure 16:
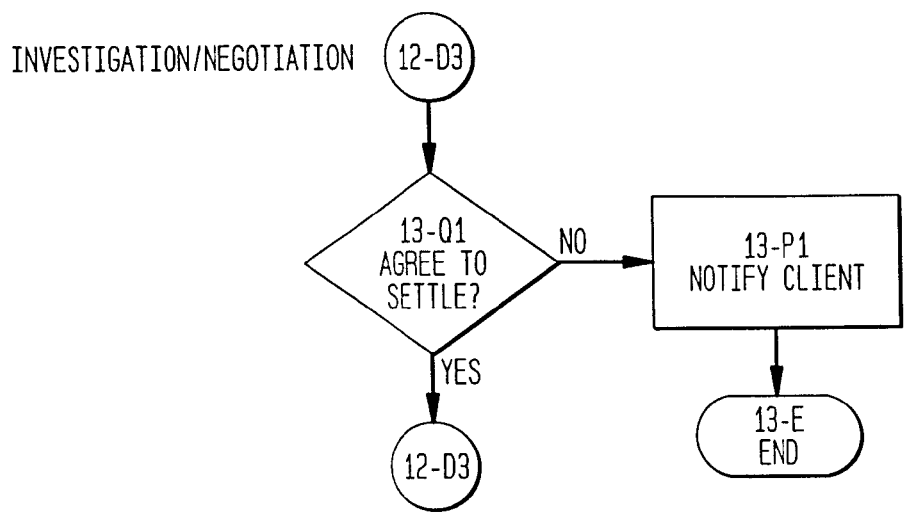
FIG. 16 shows a flow diagram of investigation/negotiation.

FIG. 16 shows a flow diagram for investigation/negotiation, with corresponding definitions as listed in Table 16, below.

TABLE 16

| | |
|---|---|
| 13-Q1 | Claims determines whether to agree to settle. |
| 13-P1 | If Claims decides not to settle, the client is notified, and the process ends. |

Figure 17:
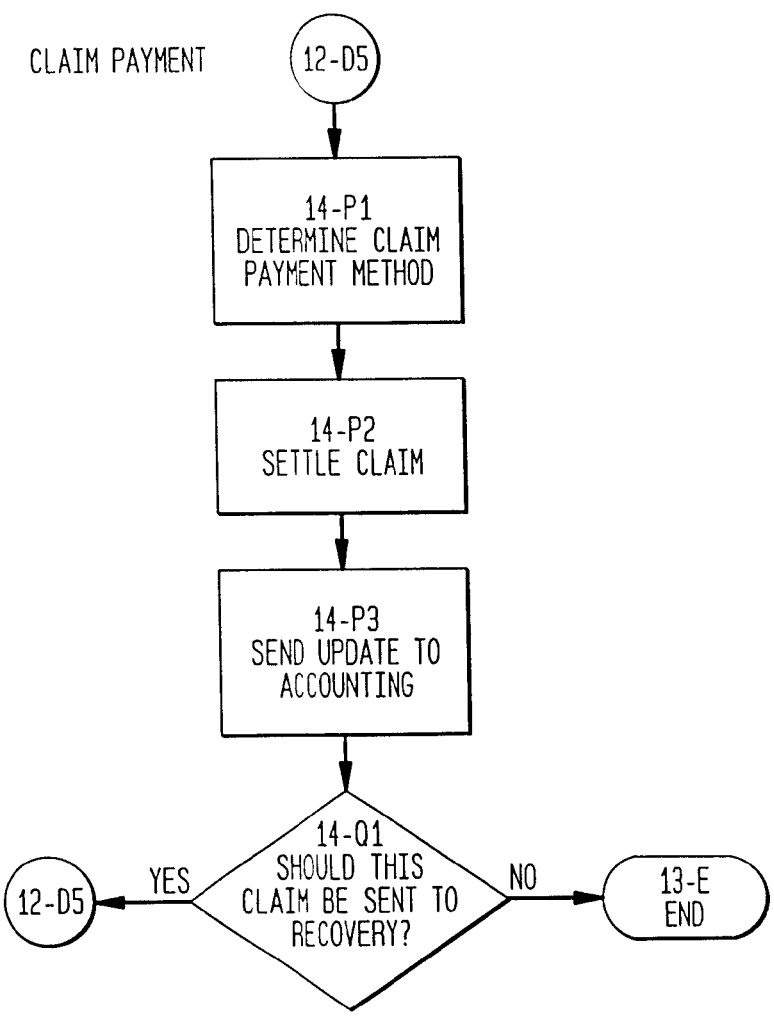
FIG. 17 shows a flow diagram of claim payment.

FIG. 17 shows a flow diagram for claim payment, with corresponding definitions as listed in Table 17, below.

TABLE 17

| | |
|---|---|
| 14-P1 | Claim payment method is determined. It can be the same as the method used to collect premiums, or it may be different. |
| 14-P2 | Settle claim. Claim payment can be made by local insurer entity, or centrally. |
| 14-P3 | Send update to accounting. |
| 14-Q1 | Determination is made whether to forward to Recovery. Business rules may include dollar amount (e.g., "send all claims above $X to recovery"), and type of loss. |
| 14-E | If no recovery is involved, close the file. |

FIG. 18 shows a flow diagram for claim acknowledgment, with corresponding definitions as listed in Table 18, below.

TABLE 18

| | |
|---|---|
| 17-P1 | The required documents are determined, based on the transaction data. |
| 17-O1 | The user receives an acknowledgment that the claim was successfully received, along with a list of the documentation that is necessary, and the name of a recommended surveyor, if the survey is required. |
| 17-O2 | See 17-O1 |
| 17-Q1 | The system determines whether the survey is required, based on predefined rules. |
| 17-O3 | See 17-O1 |

In short, an online system for transacting cargo insurance business has been described herein. Moreover, the disclosed method includes both the underwriting and the claims processes, in addition to the quoting and policy issuance processes.

While the invention has been described by reference to specific embodiments, this was for purposes of illustration only and should not be construed to limit the scope of the invention. Numerous alternative embodiments will be apparent to those skilled in the art.

The invention claimed is:

1. A method for an insurer to automate the transaction of marine cargo insurance business on-line, comprising the steps of:
receiving a customer request on-line for insuring a cargo shipment,
generating a marine cargo insurance policy quotation on-line,
receiving on-line from the customer an acceptance of said marine cargo insurance policy quotation
generating a bill on-line corresponding to said marine cargo insurance policy quotation,
receiving on-line an acceptance of said bill by said customer,
issuing a cargo insurance certificate on-line to said customer, and
determining, by a processor a reinsurance portion of the value of said cargo insurance certificate automatically.

2. The method of claim 1 wherein, prior to generating said cargo insurance policy quotation, said customer is pre-qualified, based on said customer's claim and payment history.

3. The method of claim 2 wherein said generation of said cargo insurance policy quotation is based on pre-loaded data, as well as data inputted by said customer.

4. The method of claim 3 further comprising:
interactively modifying said cargo insurance policy quotation on-line by said customer and said insurer.

5. The method of claim 4 further comprising:
prior to receiving on-line an acceptance of said bill by said customer, receiving an indication from said customer said bill is not acceptable to said customer, and, in response, referring said customer to an underwriter.

6. The method of claim 5 further comprising:
receiving on-line a payment of said bill.

7. The method of claim 6 further comprising:
receiving on-line a subsequent claim from said customer regarding said cargo shipment.

8. The method of claim 7 further comprising:
making a risk evaluation of said cargo shipment by said insurer, based on pre-determined limits and restrictions.

9. The method of claim 8 further comprising:
validating by said insurer detail data of said cargo shipment.

10. The method of claim 9 wherein said reinsurance portion is allocated in accordance with a quota share calculation.

11. The method of claim 9 wherein said reinsurance portion is allocated in accordance with an excess loss calculation.

12. The method of claim 7 further comprising:
investigating by said insurer said subsequent claim from said customer.

13. The method of claim 7 further comprising:
paying by said insurer said subsequent claim from said customer without requiring an investigation.

14. The method of claim 1 further comprising:
generating management reports by said insurer.

15. A non-transitory computer readable medium having stored thereon computer executable instructions comprising a plurality of software routines for an insurer to automate the transaction of cargo insurance business, said plurality of software routines comprising:
a) a first software routine for generating a cargo insurance policy quotation in response to a customer request to insure a cargo shipment,
b) a second software routine for generating a bill corresponding to said cargo insurance policy quotation upon acceptance of said cargo insurance policy quotation by said customer,
c) a third software routine for issuing a cargo insurance certificate to said customer upon acceptance of said bill by said customer,
d) a fourth software routine for determining a reinsurance portion of the value of said cargo insurance certificate automatically, and
e) a fifth software routine for processing a subsequent claim from said customer regarding said cargo shipment.

16. The computer readable medium of claim 15 further comprising a sixth software routine for pre-qualifying said customer, based on a claim and payment history of said customer, prior to generating said cargo insurance policy quotation.

17. The computer readable medium of claim 15 wherein said first software routine generates said cargo insurance policy quotation based on pre-loaded data, as well as data inputted by said customer.

18. The computer readable medium of claim 17 further comprising a seventh software routine for referring said customer to an underwriter when said bill is not acceptable to said customer.

19. The computer readable medium of claim 18 further comprising an eighth software routine for processing payment of said bill.

20. The computer readable medium of claim 19 further comprising a ninth software routine for issuing said cargo insurance certificate.

21. The computer readable medium of claim 20 further comprising a tenth software routine for making a risk evaluation of said cargo shipment, said risk evaluation based on pre-determined limits and restrictions.

22. The computer readable medium of claim 21 further comprising an eleventh software routine for validating detail data of said cargo shipment.

23. The computer readable medium of claim 22 further comprising a twelfth software routine for allocating said reinsurance portion in accordance with a quota share calculation.

24. The computer readable medium of claim 22 further comprising a thirteenth software routine for allocating said reinsurance portion in accordance with an excess loss calculation.

25. The computer readable medium of claim 15 further comprising a fourteenth software routine for generating management reports by said insurer.

* * * * *